(12) United States Patent
Elings et al.

(10) Patent No.: US 10,353,986 B2
(45) Date of Patent: Jul. 16, 2019

(54) AUTOMATICALLY DIVIDING TEXT INTO MULTIPLE COLUMNS

(71) Applicant: Apple Inc., Cupertino, CA (US)

(72) Inventors: Michel Elings, Palo Alto, CA (US); Pepijn T. Zoon, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/866,948

(22) Filed: Sep. 26, 2015

(65) Prior Publication Data

US 2017/0031868 A1     Feb. 2, 2017

Related U.S. Application Data

(60) Provisional application No. 62/200,094, filed on Aug. 2, 2015.

(51) Int. Cl.
*G06F 17/00* (2019.01)
*G06F 17/21* (2006.01)
*G06F 17/22* (2006.01)

(52) U.S. Cl.
CPC .......... *G06F 17/211* (2013.01); *G06F 17/212* (2013.01); *G06F 17/2294* (2013.01)

(58) Field of Classification Search
CPC ............................. G06F 17/2247; G06F 17/22
USPC .......................... 715/251, 253, 254, 256, 243
See application file for complete search history.

(56) References Cited

U.S. PATENT DOCUMENTS

| | | | |
|---|---|---|---|
| 6,023,714 A | 2/2000 | Hill et al. | |
| 6,374,273 B1 | 4/2002 | Webster | |
| 7,640,516 B2 | 12/2009 | Atkins | |
| 7,788,579 B2 | 8/2010 | Berkner et al. | |
| 8,291,314 B2 | 10/2012 | Atkins | |
| 8,327,262 B2 | 12/2012 | Tarumi | |
| 8,484,229 B2 * | 7/2013 | Almuhareb | G06F 17/2223 707/755 |
| 8,543,911 B2 * | 9/2013 | Mansfield | G06F 17/212 715/243 |
| 8,665,294 B2 | 3/2014 | Hirooka | |
| 9,152,292 B2 | 10/2015 | Xiao et al. | |
| 9,251,123 B2 * | 2/2016 | Heinz | G06F 17/211 |
| 9,348,801 B2 | 5/2016 | Oliveira et al. | |
| 9,396,167 B2 | 7/2016 | Doll et al. | |
| 9,477,382 B2 * | 10/2016 | Hicks | G06F 3/0483 |
| 9,577,965 B2 * | 2/2017 | Yang | G06F 17/3089 |
| 2005/0055635 A1 | 3/2005 | Bargeron et al. | |
| 2010/0174732 A1 * | 7/2010 | Levy | G06F 17/211 707/768 |

(Continued)

*Primary Examiner* — Stephen S Hong
*Assistant Examiner* — Matthew J Ludwig
(74) *Attorney, Agent, or Firm* — Fletcher Yoder PC

(57) ABSTRACT

Some embodiments provide a method for displaying text content on a device. The method receives a set of text content arranged in a single column. The method identifies a separable segment of the text content for display on a device. Based on properties of the text content and the device, the method determines whether the separable segment of the text content meets a set of characteristics for dividing the segment of text content into more than one column for display. When the separable segment of text content meets the set of characteristics, the method displays the segment of text content using more than one column.

25 Claims, 15 Drawing Sheets

(56) References Cited

U.S. PATENT DOCUMENTS

| | | | |
|---|---|---|---|
| 2013/0305144 A1* | 11/2013 | Jackson | G06F 17/217 |
| | | | 715/246 |
| 2014/0181646 A1 | 6/2014 | Rangwala et al. | |
| 2014/0215308 A1* | 7/2014 | Cantrell | G06F 17/30905 |
| | | | 715/234 |
| 2014/0258849 A1* | 9/2014 | Chung | G06F 17/212 |
| | | | 715/243 |
| 2014/0281939 A1 | 9/2014 | Agrawal | |
| 2015/0215259 A1* | 7/2015 | Pellicer | H04L 51/063 |
| | | | 709/206 |
| 2017/0010781 A1* | 1/2017 | Bostick | G06F 17/211 |

* cited by examiner

AUTOMATICALLY DIVIDING TEXT INTO MULTIPLE COLUMNS

BACKGROUND

Electronic visual content, such as electronic books or magazines, is generally designed for a particular type of display. The author of an electronic document will typically lay out content in a specific way (e.g., page by page), envisioning the display of a page on a specific size screen. In general, when viewed on a different size screen than that for which the document is designed, the layout is reduced or expanded as a whole. However, today many types of content, including text content (e.g., books, articles, etc.) will be consumed by end users on many different types and sizes of devices. As such, techniques should be developed to optimize the display of this content for multiple types of devices.

BRIEF SUMMARY

Some embodiments provide a method for automatically displaying a segment of text using multiple columns when the text segment meets a set of characteristics for the multiple column display. When an electronic device of some embodiments receives a set of text content for display (e.g., an electronic book or magazine, a word processing document, etc.), the device identifies a separable segment of contiguous text that will be displayed (e.g., one or more paragraphs, a stylistically different section of text, etc.). If text splitting is allowed for the separable segment of text, then the device determines whether the segment meets a set of heuristics for division into two or more columns, and displays the text using the two or more columns if the set of heuristics are met.

To determine whether to split a single column of text content into multiple columns, some embodiments first identify a separable segment of the text content. A separable segment of the text content is a segment that the electronic device can separate out from its surrounding text and split into multiple columns. Some embodiments impose an initial requirement that the separable segment must fit entirely within the display (as a single column) in order to be split. In general, the reader should not have to scroll down to finish a column and then scroll back up to start the next column, and if the text does not fit within the display as one column it will not likely fit within the display once split into multiple columns. Some embodiments will decrease the line height (a technique called leading) in order to allow a segment that would otherwise not fit on the display to be eligible for text splitting. In addition, the device must be able to identify a natural division at the beginning and end of the separable segment. This division could be based on paragraph identifiers (e.g., tags embedded in the document, white space such as indents or skipped lines, etc.), stylistic breaks (e.g., a section with larger or smaller font, or bold, underlined, italicized, etc. text), section breaks, etc.

Once the separable segment of text has been identified, the device then determines whether the segment can be adequately displayed in multiple columns or whether to leave the text as one column. This decision may depend on the size and orientation of the device, the size of the font used to display the text, whether the text will have the same number of lines in each of the columns, whether the text will have any widows or orphans when split, etc. To determine the number of columns between which to ideally split the text, some embodiments use a desired column width of 30-40 characters, which allows the user to read without too much back and forth eye/head movement while ensuring that the line breaks for larger words will not result in very short text lines with only a word or two (for the most part). As a result, increased font size (e.g., as a device setting for users with poor up-close vision) will result in less text splitting, because the text lines would become too short.

Some embodiments prevent the device from splitting the text segment into multiple columns when doing so would either result in a widow or orphan (i.e., a single line of a paragraph at the beginning or end of a column) or would result in the columns not all having the same number of lines. However, some such embodiments also use various techniques to avoid these situations. For instance, the device might modify aspects of the text by adding or subtracting from the word spacing or the space between characters within a word (tracking), which may be used to affect the number of lines (by, e.g., pushing words onto the next line or pulling words onto the previous line).

As mentioned, the electronic device of some embodiments determines whether text splitting (into multiple columns) is allowed before determining whether the text segment is capable of being divided for display on the device. In some embodiments, the author of the document (book, magazine, etc.) determines, at the time when the document is created, whether to allow text splitting. For instance, if an author has a very specific layout in mind, with various images and other content around which the text wraps, the author might turn off text splitting for the document. On the other hand, for a purely text document or document portion, the author might want to allow the end user device to determine the best way to display the text content. In some embodiments, the authoring device allows the author to view the text as it would be split for certain devices in different orientations, enabling the author to better determine whether to allow the text splitting.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for automatically displaying a segment of text using multiple columns when the text segment meets a set of characteristics for the multiple column display. When an electronic device of some embodiments receives a set of text content for display (e.g., an electronic book or magazine, a word processing document, etc.), the device identifies a separable segment of contiguous text that will be displayed (e.g., one or more paragraphs, a stylistically different section of text, etc.). If text splitting is allowed for the separable segment of text, then the device determines whether the segment meets a set of heuristics for division into two or more columns, and displays the text using the two or more columns if the set of heuristics are met.

Figure 1:
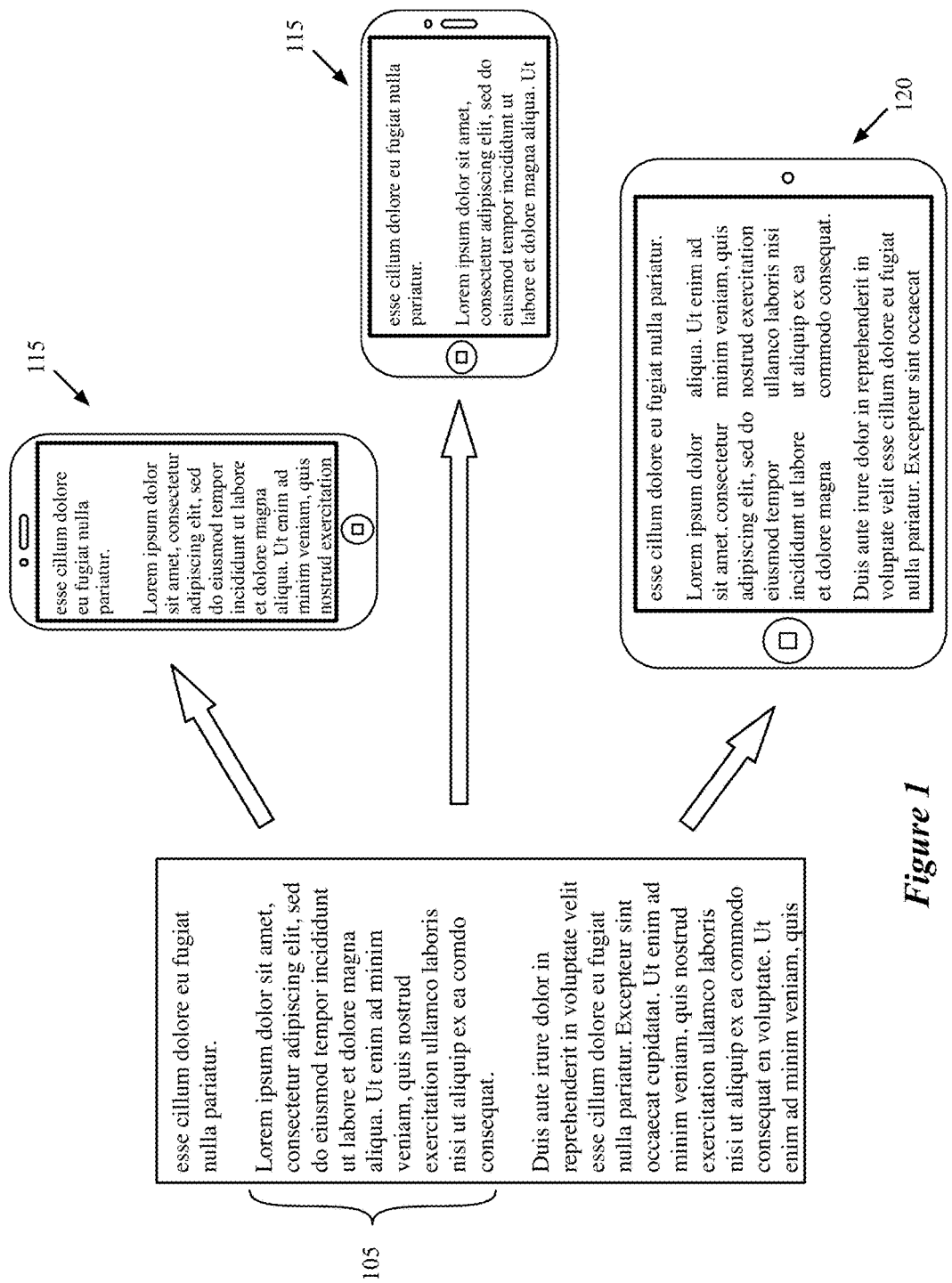
FIG. 1 illustrates a set of text content and its display on several devices in different orientations, with a segment of the text content split into two columns on one of those devices.

FIG. 1 illustrates a set of text content 100 and its display on several devices in different orientations, with a segment of the text content split into two columns on one of those devices. Specifically, the text content 100 includes the bottom of a first paragraph, then a full paragraph 105, and the top portion of a third paragraph. The first paragraph 105 is displayed as a single column in both the portrait and landscape orientations of a first device 115 (e.g., a smart phone), but split between two columns on a second device 120 (e.g., a tablet).

To determine whether to split a single column of text content into multiple columns, some embodiments first identify a separable segment of the text content. A separable segment of the text content is a segment that the electronic device can separate out from its surrounding text and split into multiple columns. Some embodiments impose an initial requirement that the separable segment must fit entirely within the display (as a single column) in order to be split. In general, the reader should not have to scroll down to finish a column and then scroll back up to start the next column, and if the text does not fit within the display as one column it will not likely fit within the display once split into multiple columns. Some embodiments will decrease the line height (a technique called leading) in order to allow a segment that would otherwise not fit on the display to be eligible for text splitting. In addition, the device must be able to identify a natural division at the beginning and end of the separable segment. This division could be based on paragraph identifiers (e.g., tags embedded in the document, white space such as indents or skipped lines, etc.), stylistic breaks (e.g., a section with larger or smaller font, or bold, underlined, italicized, etc. text), section breaks, etc.

In the example of FIG. 1, the first paragraph 105 is a separable segment of text for the device 120. In some cases, for at least the second device 120, the paragraph 105 might be combined with at least one of the surrounding paragraphs to form a larger separable segment, depending on whether the contiguous paragraphs would fit on the device screen. In this case, the paragraph 105 fits on the device 115 only in its portrait orientation, and fits on the larger device 120 in both portrait and landscape orientation. Thus, in landscape orientation (shown in the middle of FIG. 1), the first device 115 does not display the paragraph 105 as multiple columns, as the device does not divide a text segment into multiple columns when the text segment does not fit within the display.

Once the separable segment of text has been identified, the device then determines whether the segment can be adequately displayed in multiple columns or whether to leave the text as one column. This decision may depend on the size and orientation of the device, the size of the font used to display the text, whether the text will have the same number of lines in each of the columns, whether the text will have any widows or orphans when split, etc. To determine the number of columns between which to ideally split the text, some embodiments use a desired column width of 30-40 characters, which allows the user to read without too much back and forth eye/head movement while ensuring that the line breaks for larger words will not result in very short text lines with only a word or two (for the most part). As a result, increased font size (e.g., as a device setting for users with poor up-close vision) will result in less text splitting, because the text lines would become too short.

In the examples shown in FIG. 1, the first device 115 in portrait orientation (shown at the top of the figure) is not wide enough, given the text size, to use multiple columns. This is generally the case for most smart phones, unless the user has a very large phone or prefers very small text. For the second device 120 in landscape orientation (shown at the bottom of the figure), the text of paragraph 105 is divided into two columns in the display. While the columns are shown with 15-20 characters per line, this is for illustrative purposes, as a larger number of characters per line is generally preferable.

Some embodiments prevent the device from splitting the text segment into multiple columns when doing so would either result in a widow or orphan (i.e., a single line of a paragraph at the beginning or end of a column) or would result in the columns not all having the same number of lines. However, some such embodiments also use various techniques to avoid these situations. For instance, the device might modify aspects of the text by adding or subtracting from the word spacing or the space between characters within a word (tracking), which may be used to affect the number of lines (by, e.g., pushing words onto the next line or pulling words onto the previous line).

As mentioned, the electronic device of some embodiments determines whether text splitting (into multiple columns) is allowed before determining whether the text segment is capable of being divided for display on the device. In some embodiments, the author of the document (book, magazine, etc.) determines, at the time when the document is created, whether to allow text splitting. For instance, if an author has a very specific layout in mind, with various images and other content around which the text wraps, the author might turn off text splitting for the document. On the other hand, for a purely text document or document portion, the author might want to allow the end user device to determine the best way to display the text content. In some embodiments, the authoring device allows the author to view the text as it would be split for certain devices in different orientations, enabling the author to better determine whether to allow the text splitting.

FIG. 1 provides an example of splitting text into multiple columns according to some embodiments of the invention. Several more detailed examples are described below. Section I describes the process performed by some embodiments to split text into multiple columns, with several examples. Section II then describes the authoring tool of some embodiments that allows authors to enable or disable text splitting. Next, Section III describes the software architecture of a device for viewing content on which text splitting is performed. Finally, Section IV describes an electronic system with which some embodiments of the invention are implemented.

I. Automatic Splitting of Text into Multiple Columns

As mentioned above, some embodiments automatically display a segment of text using multiple columns when the text segment meets a set of characteristics for a particular device on which the text is to be displayed. Specifically, the particular device identifies a separable segment of contiguous text (e.g., in an e-book or e-magazine, a word processing document, a PDF document, a slide in an electronic slideshow presentation, etc.), and determines whether the segment of text can be split into multiple columns, considering various factors. When the segment meets those various factors, the device displays the text between multiple columns.

Figure 2:
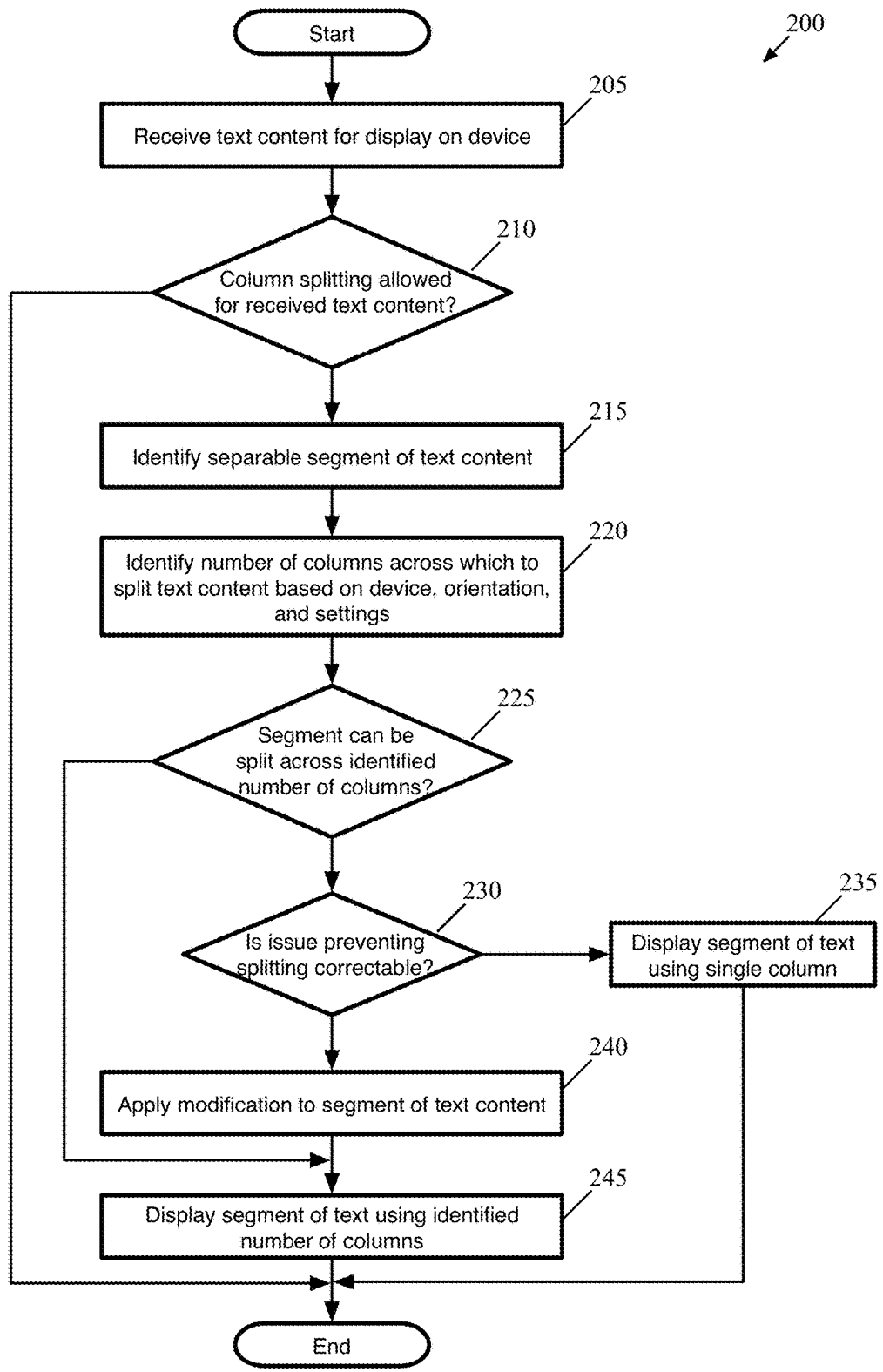
FIG. 2 conceptually illustrates a process of some embodiments for splitting text into multiple columns.

FIG. 2 conceptually illustrates a process 200 of some embodiments for splitting text into multiple columns. This text rearrangement process may be performed by a device used by the text author in order to determine how her text document (which may contain additional content such as videos, images, other types of text, etc. about which the text to which the process is applied wraps) will look when viewed by an end user on a particular device in a particular orientation. The text rearrangement process of some embodiments may also be performed by the end user device in order to display the text in an appropriate number of columns for viewing by the end user, in order to create an optimal reading experience. This process may be performed by an application (e.g., a content creation application on the content authoring side or a content viewing application on an end user device) in some embodiments. In other embodiments, the process 200 is an operating system process, which may be called by an application. The process 200 will be described by reference to a number of examples, shown in FIGS. 3-10.

As shown, the process 200 begins by receiving (at 205) text content for display on the device. The text content may be a portion of text or the entirety of text from any number of different types of sources. The text sources could include electronic books or magazines (or magazine articles), PDF files, word processing documents, slideshow presentations, web pages, etc. In some embodiments, the text content is a set of contiguous text from a document, which may span one or more text lines, paragraphs, pages, etc. The text may include formatting such as paragraph breaks, stylistic information (bold, underline, italics, etc.), indentations, etc. The text may also be formatted to wrap within a paragraph around other content in the text source, or simply from line to line based on the text size and display device width. That is, the same text content might be displayed differently (i.e., with different line breaks) on two different devices, due to device size and settings.

The process then determines (at 210) whether column splitting is allowed for the received text content. As described in further detail below in Section II, in some embodiments the author of the text source has an option to either allow end user devices to split single-column text into multiple columns or prevent the end user devices from doing so. For instance, an author might lay out content in a certain way and way to prevent the end user devices from modifying that layout to the extent possible. On the other hand, the author might have a document that is primarily a contiguous set of text, and would want the end user device to lay out that text for an optimal reading experience. Some embodiments allow the author to preview the document with and without column splitting allowed, for various devices. When column splitting is not allowed for the received text, the process ends.

Assuming the text may be split into columns, the process 200 then determines (i) whether to split up the text (or portions of text) into multiple columns and (ii) how many columns to use. To do so, the process identifies (at 215) a separable segment of text content. The received content may include several separable segments of text content, or may not include any such segments. A separable segment of text content on a particular device, in some embodiments, is a contiguous segment of text that (i) is naturally separable from the rest of the text content and (ii) fits within the display for the particular device in a particular orientation.

Naturally separable segments are segments of text that a reader would separate from the surrounding text in the course of reading and which can be identified as such by the device. Paragraph breaks, section breaks, etc. are examples of such natural breaks in text, though the breaks must be identifiable by the device. For example, one or more paragraphs are naturally separable from the surrounding text if there is a clear indication in the text as to the paragraph breaks (e.g., an indentation or a skipped line). In addition, a section of text with different formatting (e.g., larger font, different styling, different background color, etc.) may also be considered naturally separable in some embodiments (as shown below in FIG. 7).

In addition to being naturally separable from its surrounding text, the separable segment of text must fit within the display for the particular device on which it will be displayed in some embodiments. In the above FIG. 1, for instance, the paragraph 105 does not fit within device 115 in landscape orientation (the portrait orientation of device 115 represents the case in which the preferred number of columns is 1 for width-related reasons, even if the paragraph 105 would fit within the display). Some embodiments may combine multiple contiguous paragraphs into a single separable segment, if the multiple paragraphs all fit within the display. As another example, numerous short bullets that are part of a slide from a slideshow presentation might be identified as a separable segment that could be split into several columns.

Figure 3:
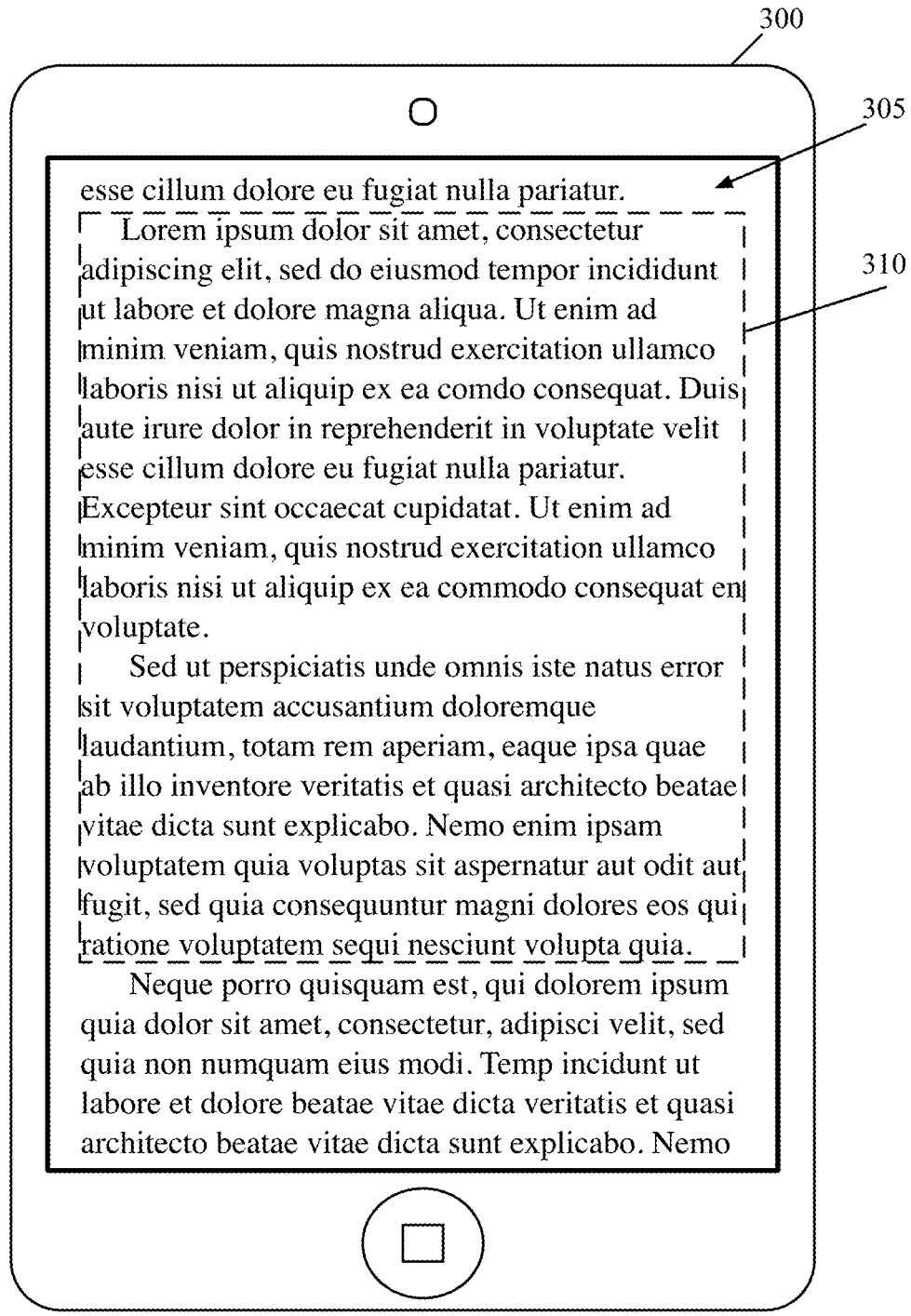
FIG. 3 illustrates an example of a set of text content for which a separable segment is identified.

FIG. 3 illustrates an example of a set of text content 305 for which a separable segment 310 is identified. The set of text content 305 is a portion of continuous text in a text document that is displayed on a device 300. In this case, the display on the device is conceptual, in that the FIG. 3 illustrates how the text content 305 would be displayed without text splitting. As shown, the paragraphs in the text content 305 are identifiable by the device based on the first-line indentation of the paragraphs, a common method for indicating new paragraphs. The paragraph prior to the separable segment 310, in some embodiments, might be too long to combine with the first paragraph in the separable segment 310 and still fit on the display screen of the device 300. However, the paragraph prior to the separable segment also might be part of a separate segment that is divided into multiple columns as well by the device. For instance, the two or three paragraphs (or just one paragraph) prior to the separable segment 310 could be their own separable segment. Thus, a set of text content might include numerous separable text segments for which the analysis of operations 215-245 is performed (this repetition is not shown in the process 300). As a result, the combinations of paragraphs (or other sets of text blocks) that are treated as separable segments may vary from one device to another, or even from one orientation of a particular device to the other orientation of the particular device.

For an identified separable segment, the process 200 identifies (at 220) a number of columns across which to split the text content of the separable segment based on the device, its orientation, and its settings (or settings of the text content). Some embodiments aim for a specific number of characters per text line within a column (e.g., 30-40). It should be noted that the examples shown in the figures have fewer characters per column text line than would normally be optimal, in order to illustrate the invention in larger font. The factors that may affect the number of columns for the device to use include the width of the device screen (a function of the orientation of the device screen), the font size, etc. For example, on a smaller device (e.g., a typical smart phone), the user will generally not want text to be split into two columns in portrait mode, as the columns would be very narrow (requiring either too many line breaks or too small font). Even on larger devices (e.g., a tablet device), or on smaller devices in landscape orientation, if a user requires larger font then the device may determine that multiple columns would be too few characters across.

Figure 4:
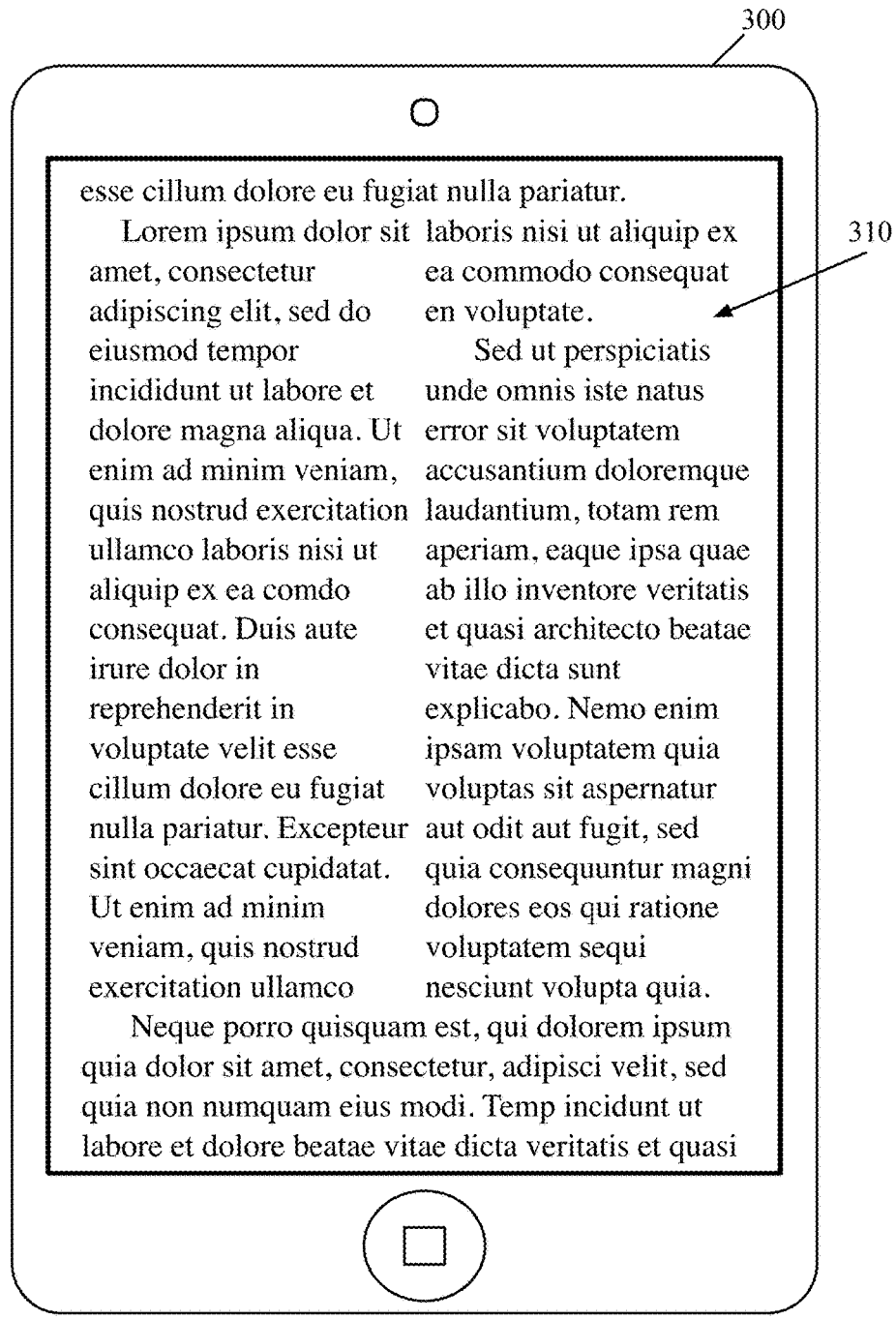
FIGS. 4-6 illustrate the separable text segment identified in FIG. 3 displayed on a device using different numbers of columns.
Figure 5:
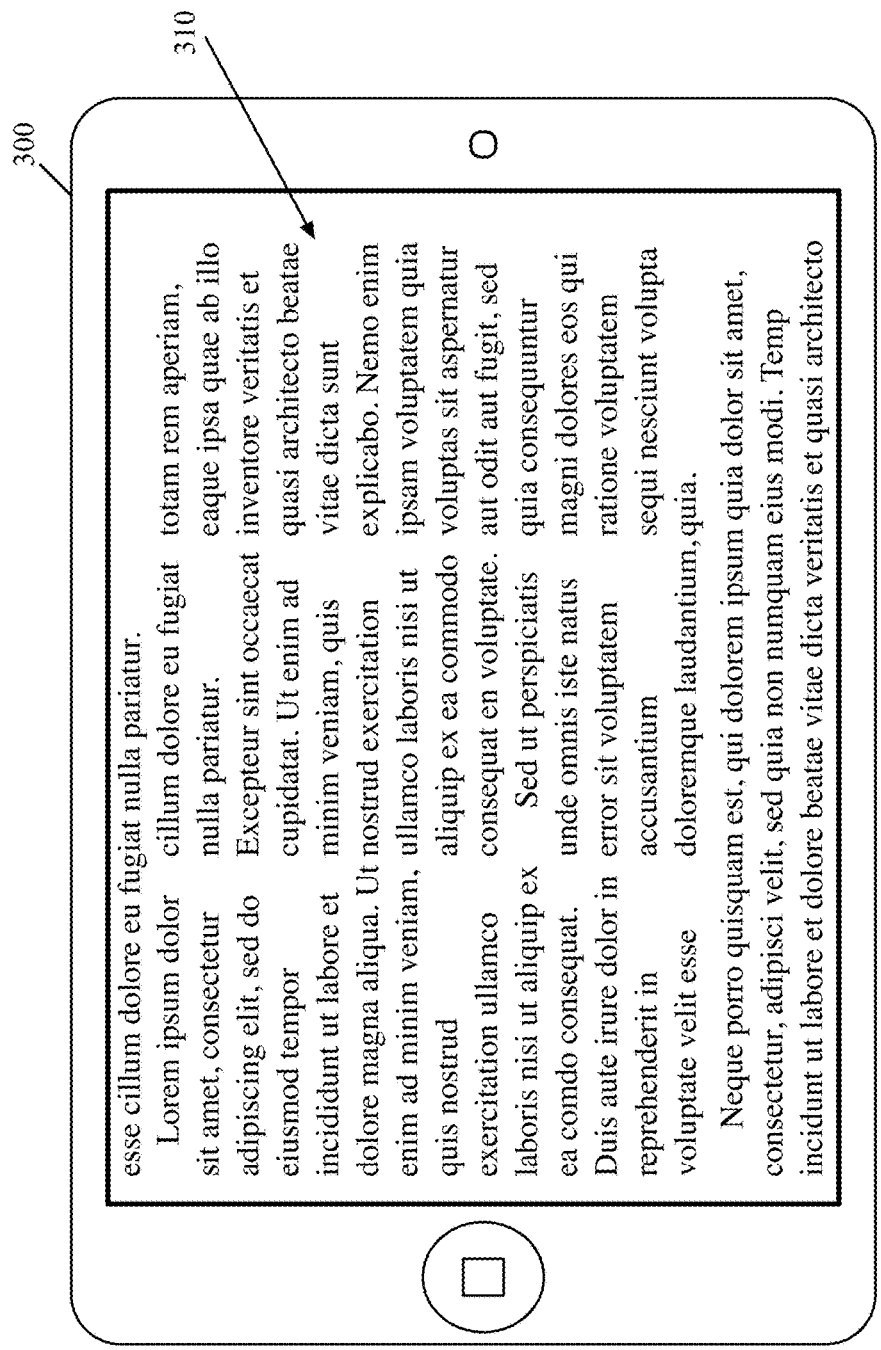
Figure 6:
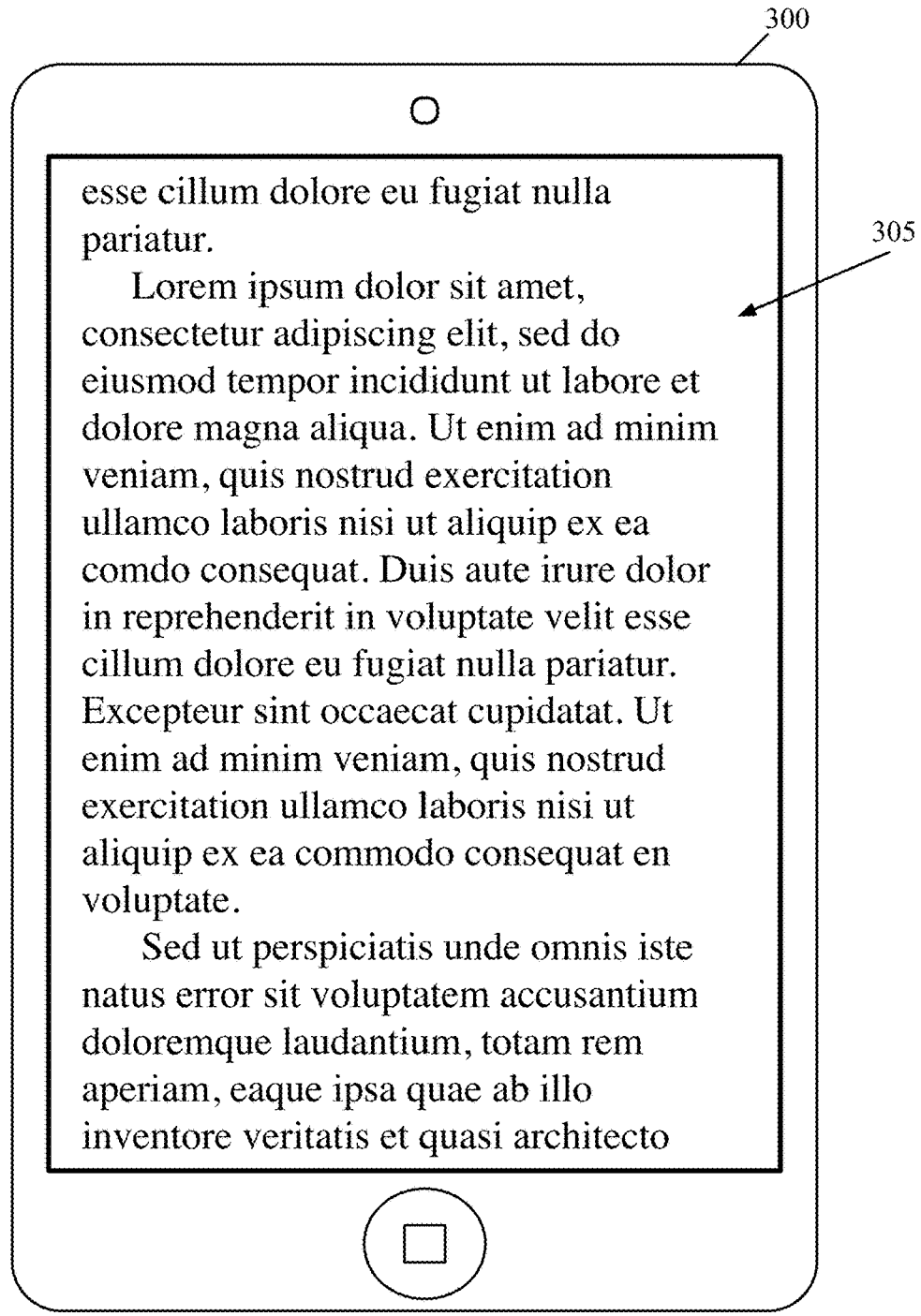

FIGS. 4-6 illustrate the separable text segment 310 displayed on the device 300 using different numbers of columns. Specifically, in FIG. 4, the device 300 is in the portrait orientation, and uses two columns to display the separable segment 310. As mentioned, the columns have less than a 30-40 character width, but this is only for illustrative purposes, as the font size relative to the device width will typically be smaller than is shown in the figure. As shown in FIG. 4, some embodiments maintain the same margins as the above and below sections of text content that are not split into several columns, so that the edges are consistent throughout. Some embodiments allow the user of the device to set the margin between columns, whereas other embodiments use automatic settings (e.g., as a portion of the display width, based on the margins at the edges of the display, etc.).

FIG. 5 illustrates the device 300 in landscape orientation, in which case the device uses three columns to display the separable segment 310. As the device is wider, this allows for the use of an extra column (in some cases, multiple extra columns, depending on the font size and the device width to height ratio). When a device uses different numbers of columns in different orientations, the columns may be exactly the same width or slightly different widths in the two different orientations. In this case, the columns in landscape orientation are slightly narrower (in order to fit three columns) than the columns in portrait orientation, such that the first text line of the first column in FIG. 4 does not fit completely in the first text line of the first column in FIG. 5.

FIG. 6 illustrates the same text content 305 on the device 300 with a larger font setting. In this case, the segment 310 is not actually a separable segment, as the two paragraphs do not collectively fit within the display screen at the larger font setting. In addition, while the first paragraph of the segment 310 (beginning "Lorem ipsum . . . ") fits within the display device on its own, and is therefore a separable segment, the font is too large relative to the display width for the device to use multiple columns for display of this paragraph. Whereas the columns in FIGS. 4 and 5 had approximately 22-25 characters per text line of a column, dividing this paragraph into two columns with the larger font in FIG. 6 would result in text lines with about 15-18 characters per column. The fewer characters per text line within a column, the greater the likelihood of awkward-looking short text lines as the result of long words being pushed to a next line.

Figure 7:
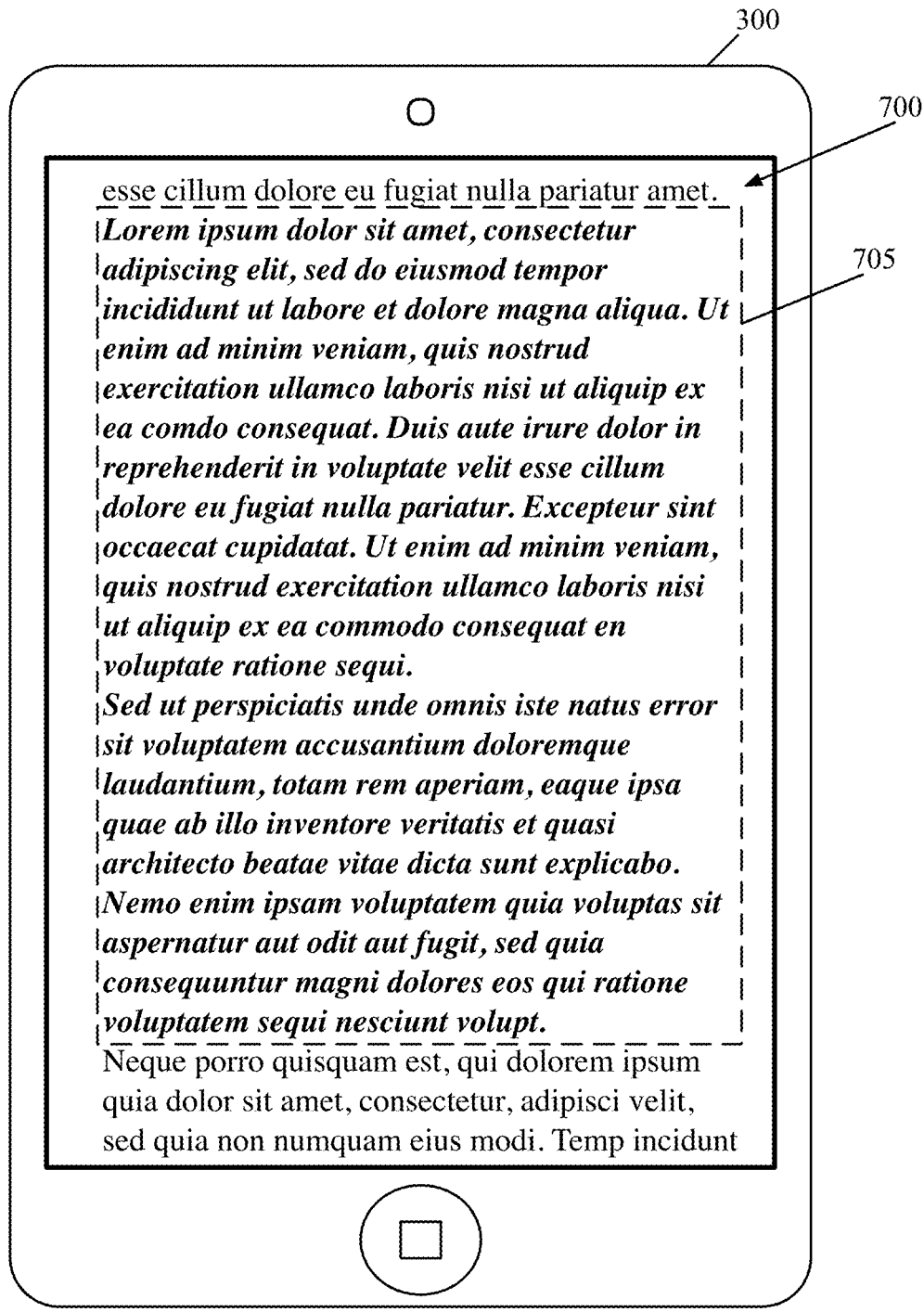
FIGS. 7 and 8 illustrate a second set of text content on the device, which is identified based on its styling.
Figure 8:
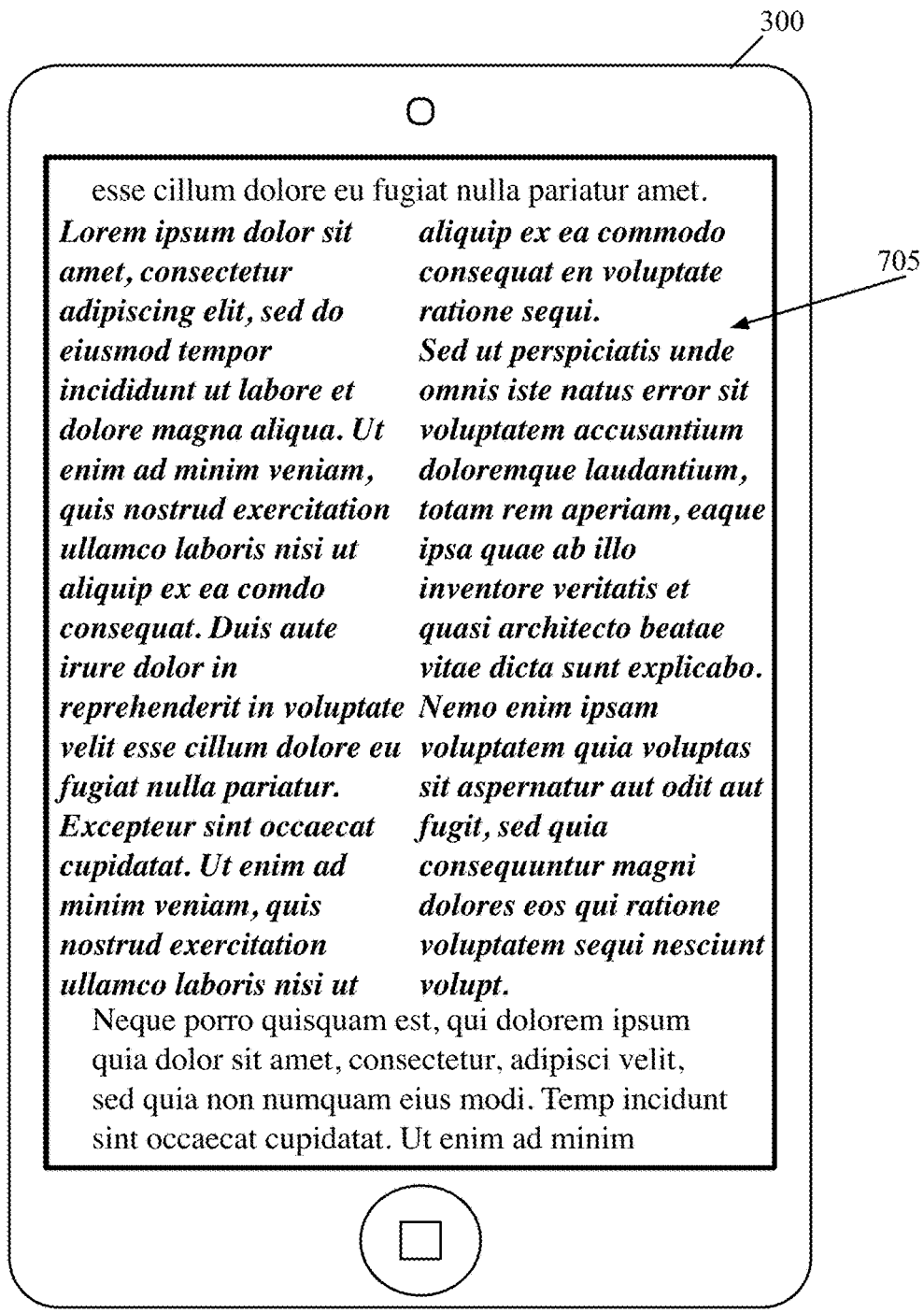

FIGS. 7 and 8 illustrate a second set of text content 700 on the device 300. As shown in FIG. 7, the set of text content 700 does not have any clear indicators to identify paragraph breaks, such as skipped lines or indents. However, the styling of the text in the two paragraphs that make up an identified segment 705 are formatted in bold italics, indicative that the text is set off from the surrounding text.

FIG. 8 illustrates the display of the separable segment 705 using two columns according to some embodiments. In this case, because the segment is identified as an identifiably different section of text (based on the styling), some embodiments do not worry about preserving the same margins as used for the surrounding text, and instead display the separable segment using multiple columns with different margins. These margins may be narrower than the surrounding text (as in this case, making the text itself wider) or narrower than the surrounding text. In addition, when a segment is set off as a separate layout or section, some embodiments allow horizontal scrolling through numerous columns. For example, if the bold italicized portion was significantly longer, some embodiments would create third, fourth, etc. columns which would be generated for off-screen "display". The user could then scroll to the right to view the third column (e.g., with a left swipe action on a touchscreen device) as the first column slides off of the display.

After identifying the number of columns to use for a separable text segment, the process 200 determines (at 225) whether the segment can be split across the identified number of columns. Various different embodiments place certain restrictions on when to prevent text from splitting into a particular number of columns. For example, if splitting the text across multiple columns results in two of the columns having different numbers of text lines, then some embodiments prevent the split. In addition, if the splitting results in a widow or orphan (i.e., a single line from a multi-line paragraph at the start or end of a column, then some embodiments prevent the split.

When the segment can be split across the identified number of columns (if the number of columns is one, then the answer to this is always yes), the process proceeds to 245, described below. However, when the segment cannot be split across the identified number of columns (e.g., because of a widow or orphan, or because of an uneven number of text lines in each column), the process 200 determines (at 230) whether the issue that prevents splitting is correctable for the segment. Some embodiments enable the use of tracking, word spacing, or leading within a segment in order to enable the segment to use the identified number of columns without violating any of the rules for multiple column display.

Tracking is the addition or removal of space between characters in text. Removing a portion of the space between characters may enable the first word of a line to move up to the previous line, creating a potentially cascading effect that lessens the number of text lines in a segment (e.g., to get from 2N+1 to 2N text lines, with N lines in each of two columns). Similarly, adding a small amount of space between characters may enable the last word of a line to move down to the next line, creating a potentially cascading effect that increases the number of text lines in a segment (e.g., to get from 3M−1 to 3M text lines, with M lines in each of three columns). Some embodiments place an upper bound (e.g., +/−5%) on the amount of tracking allowed. Word spacing has similar effects to tracking, but involves the increase or decrease of space between words rather than the space between characters. Similar to the tracking, some embodiments place an upper bound (e.g., +/−5%) on the amount of change in word spacing.

Leading, on the other hand, does not affect the spacing within a text line, but instead modifies the spacing between text lines. Some embodiments use may use leading in some of the columns in order to enable different numbers of text lines in the columns while ensuring that the last text line is even in all of the columns. However, other embodiments do not allow leading for this purpose. Instead, some embodiments use leading at operation 215 to enable certain text to be considered a separable segment that can be split into multiple columns (by increasing the amount of text that can fit within a display).

When the issue that prevents text splitting is not correctable, the process 200 displays (at 235) the segment of text using a single column. On the other hand, when the issue is correctable, the process applies (at 240) the modification(s) to the text segment that will remove the previously identified issue (e.g., tracking, word spacing, leading). After applying this modification, the process displays (at 245) the segment of text using the modified number of columns. After displaying the text segment, the process ends.

One of ordinary skill in the art will recognize that in some embodiments, the process performs operation 235 or 245 (to display the text segment) at a later time than the operations for splitting text into multiple columns. For example, when a user opens a text source (e.g., a book, article, etc.) on a device, the device may perform operations 215-230 and 240 for all of the text, identifying multiple separable segments that may be split into multiple columns for the document. As the user reads through the content, different such segments will be displayed as the user comes to them.

Figure 9:
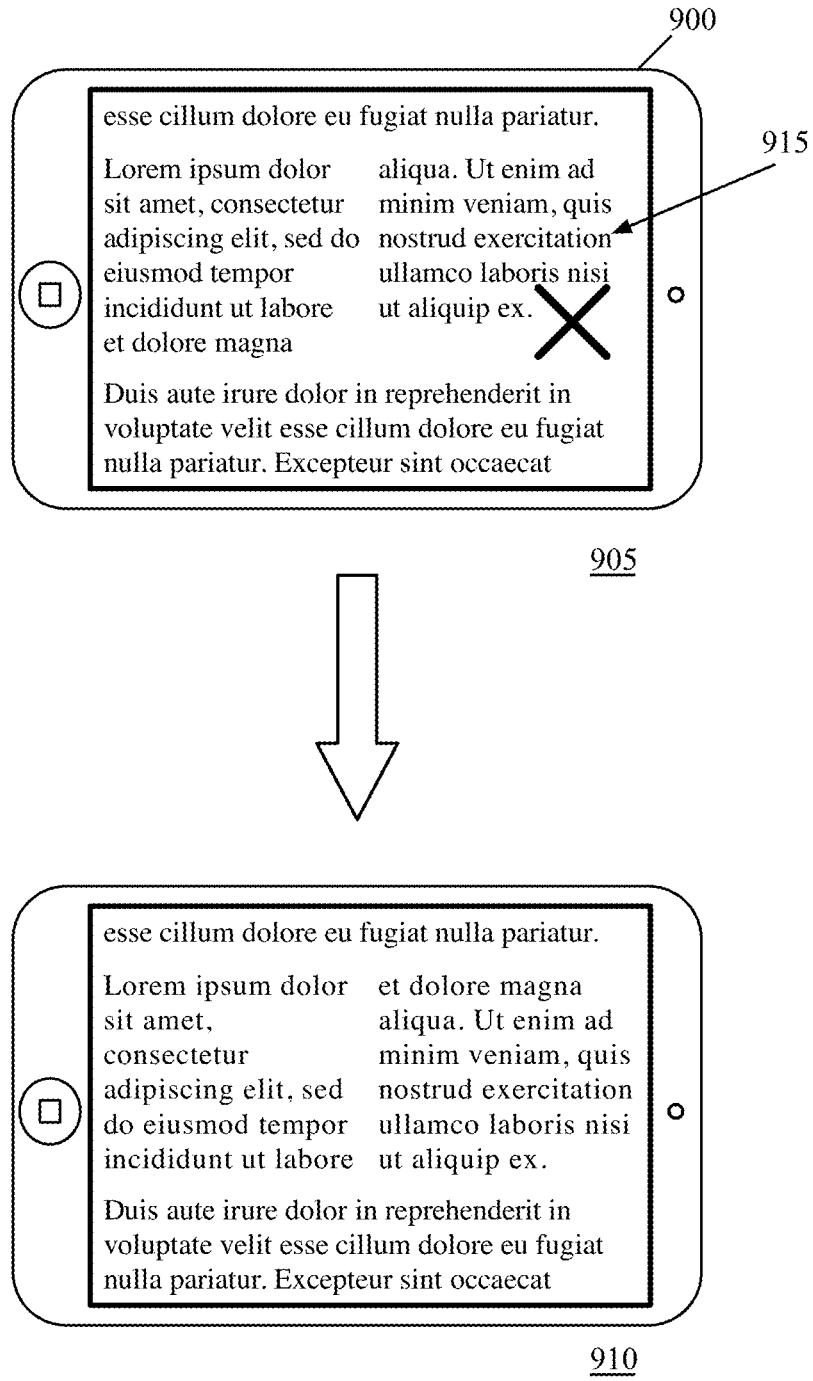
FIG. 9 illustrates an example of a separable segment of text (a single paragraph) the splitting of which results in an uneven number of text lines per column, and the application of text modification to correct the issue.

FIG. 9 illustrates an example of a separable segment of text 915 (a single paragraph) that is part of a set of content for display on a device 900. However, as shown in a first stage 905 of the figure, when split into two columns on the device 900, the separable segment of text 915 has six lines in the first column and five lines in the second column. Some embodiments prevent the device from splitting text into columns that yield such disparate numbers of text lines in the two columns.

However, as mentioned, this issue may be corrected by modifying the tracking or word spacing within the segment. In this case, the second stage 910 illustrates that the device increases the tracking, to slightly increase the space between the words in the segment. As a result, rather than having eleven total text lines, the word "consectetur" is pushed from the second to the third line, causing additional text to move down a line, eventually resulting in twelve text lines. Thus, the twelve lines may be split between two columns evenly, as shown in the second stage 910.

Figure 10:
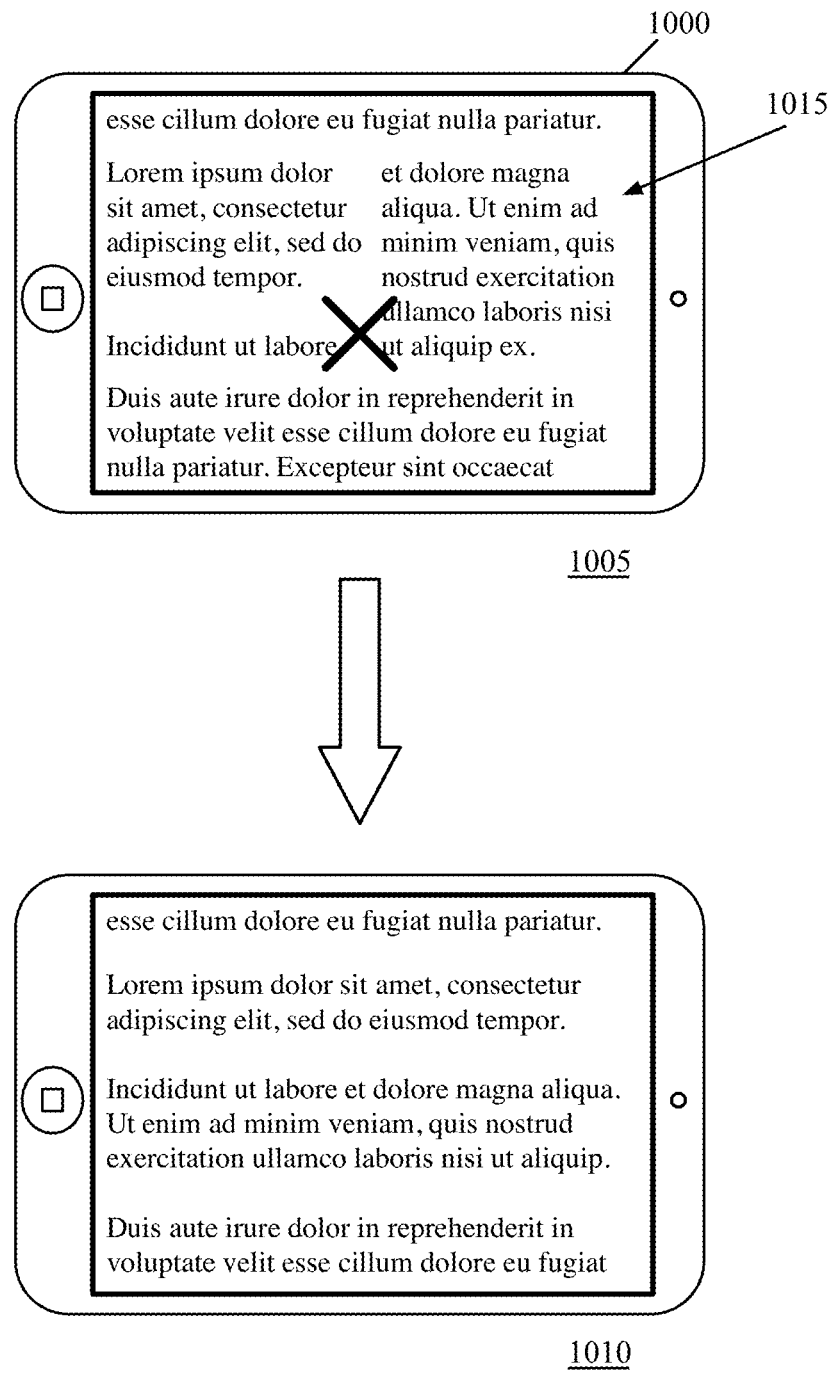
FIG. 10 illustrates the case in which splitting text into multiple columns results in an impermissible widow.

Whereas FIG. 9 illustrates the case of uneven columns, FIG. 10 illustrates the case in which splitting text into multiple columns results in an impermissible widow. As shown in a first stage 1005 of a device 1000, a separable text segment 1015 that consists of two paragraphs is split into two columns, with only the first line of the second paragraph in the first column (as the last line of the first column). This is an undesirable result, as widows and orphans tend to provide a sub-optimal reading experience, and therefore some embodiments prevent the splitting of this text.

Widows and orphans are harder to correct with modifications to tracking, word spacing, or leading, in many cases (especially in the two-column case), and therefore will often result in a single-column display for the separable text segment. Thus, the second stage 1010 shows that the two paragraphs of the segment 1015 are displayed using a single column, like the text around them. If the paragraph that begins "Duis aute . . . " is short enough, some embodiments may combine this paragraph with the previous paragraph "Incididunt . . . " to determine whether such a segment can be divided into multiple columns without violating any of the rules imposed by the device.

II. Content Generation Application

As mentioned above, in some embodiments, the author of a text source (e.g., a web page, a book, a magazine or article within a magazine, etc.) may select whether to allow text splitting for the text source (or portions of text within the text source) as part of the authoring process. For instance, such an option could be encoded as metadata within an e-publication file, within the markup language for a web page, etc. In some cases, the author may want to view the text of a particular segment in both single column and multi-column formats. The content authoring applications of some embodiments enable such a preview.

Figure 11:
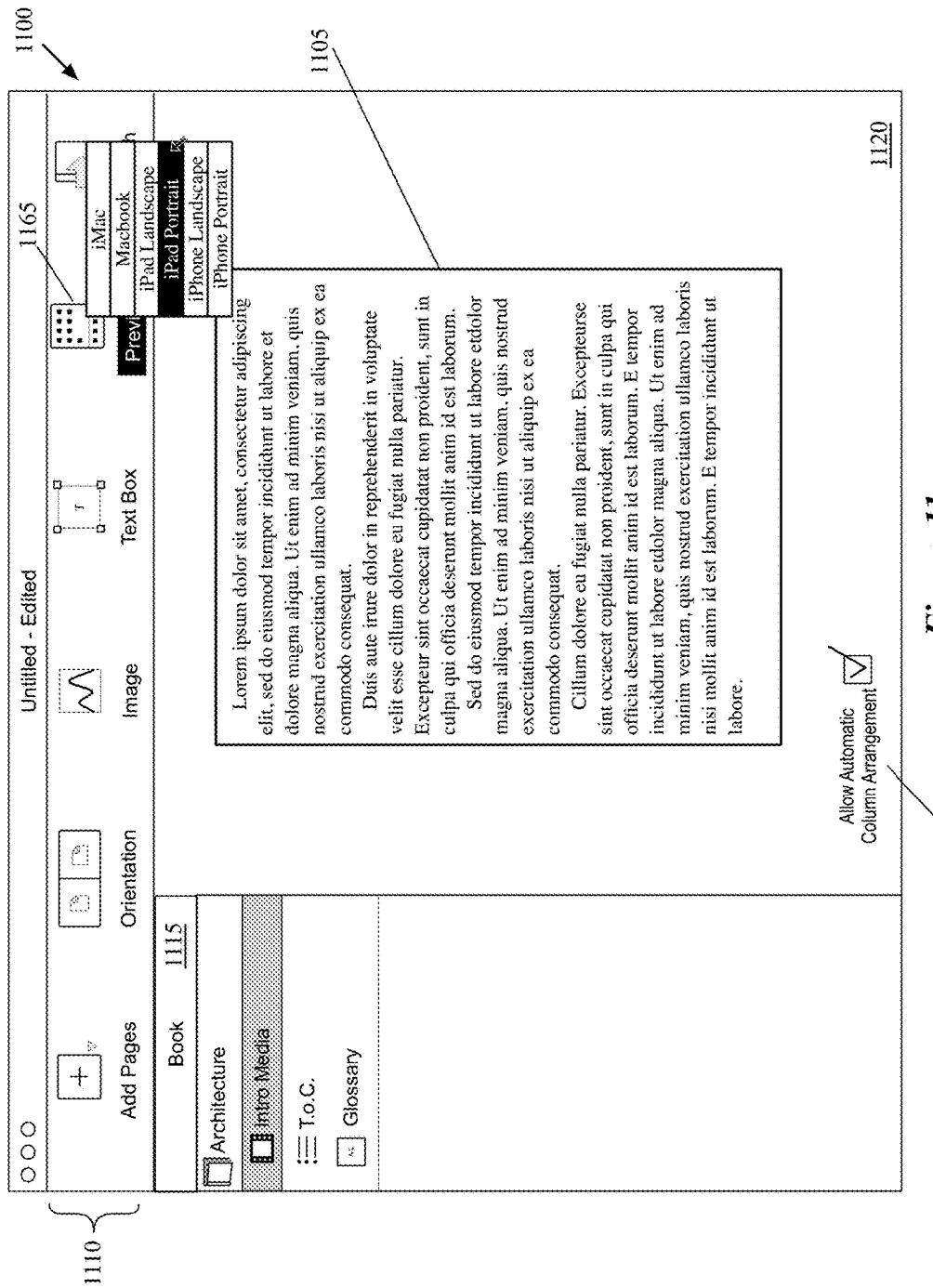
FIG. 11 illustrates an example of a set of text that an author is creating in a graphical user interface (GUI) of an electronic book authoring application of some embodiments.

FIG. 11 illustrates an example of a set of text 1105 that an author is creating in a graphical user interface (GUI) 1100 of an electronic book authoring application of some embodiments. Specifically, the text 1105 is the text for a continuously scrolling electronic document (or page of a document) that the user is creating with the authoring application. As shown, the GUI 1100 includes a set of selectable GUI items 1110, including items to add pages to the current electronic document, modify the orientation of a page, add an image or text box to the layout, preview the document, or publish the current book. One of ordinary skill would recognize that these are simply a few of the numerous possible UI tools that might be available to an author in such an application, with potentially many other UI tools available either via selectable icon, drop-down menu, etc. For example, some embodiments might provide options for changing the widths of the margins and/or gutters of a layout. The GUI 1100 also includes a document navigation section 1115, which allows the user to navigate the various pages and/or sections of an electronic book being authored.

In addition, the GUI 1100 includes a document editing and viewing section 1120, in which the user is currently authoring the text 1105 (and designing the layout) for a portion of an electronic book. This section also includes a selectable option 1125 that specifies whether automatic text splitting should be allowed for text segments in the current text layout. As shown in the figure, this option 1125 is currently selected, such that the application allows text splitting. While shown as a permanent part of the user interface in this example, one of ordinary skill in the art will recognize that this option may not be a permanent part of the UI in some embodiments. For instance, different embodiments may use a drop-down menu option, a keyboard shortcut, a dialog box option (accessible via drop-down menu, etc.), other user interface constructs, or a combination thereof to allow the user of the authoring application to decide whether to enable automatic text splitting for a set of text content when the content is viewed by end consumers of the content.

In the example, the user has selected the preview UI item 1165, one of the selectable GUI items 1110. In the illustrated embodiments, selecting this item causes the application to display various selectable options for different devices and orientations upon which the electronic document might later be viewed, with selection of one of the options causing the application to perform the automatic text splitting process and display the document as it would appear on the selected device and orientation. The various selectable devices and orientations may split the same displayed text into different numbers of columns (assuming default font sizes on the devices). In this example, the various devices are shown in descending order of display width, and thus likely descending order of the number of columns that might be used. A desktop computer (iMac) will have a wider display (assuming the document occupies the full width) than a laptop (MacBook), which in turn has a wider display than a tablet (iPad) or smart phone (iPhone) in either landscape or portrait orientations. One of ordinary skill will recognize that other devices (e.g., iPad Mini, different sizes of smart phones, other tablets or smart phones, etc.) may be supported in some embodiments, or that the authoring application may use generic display sizes for the previews).

Figure 12:
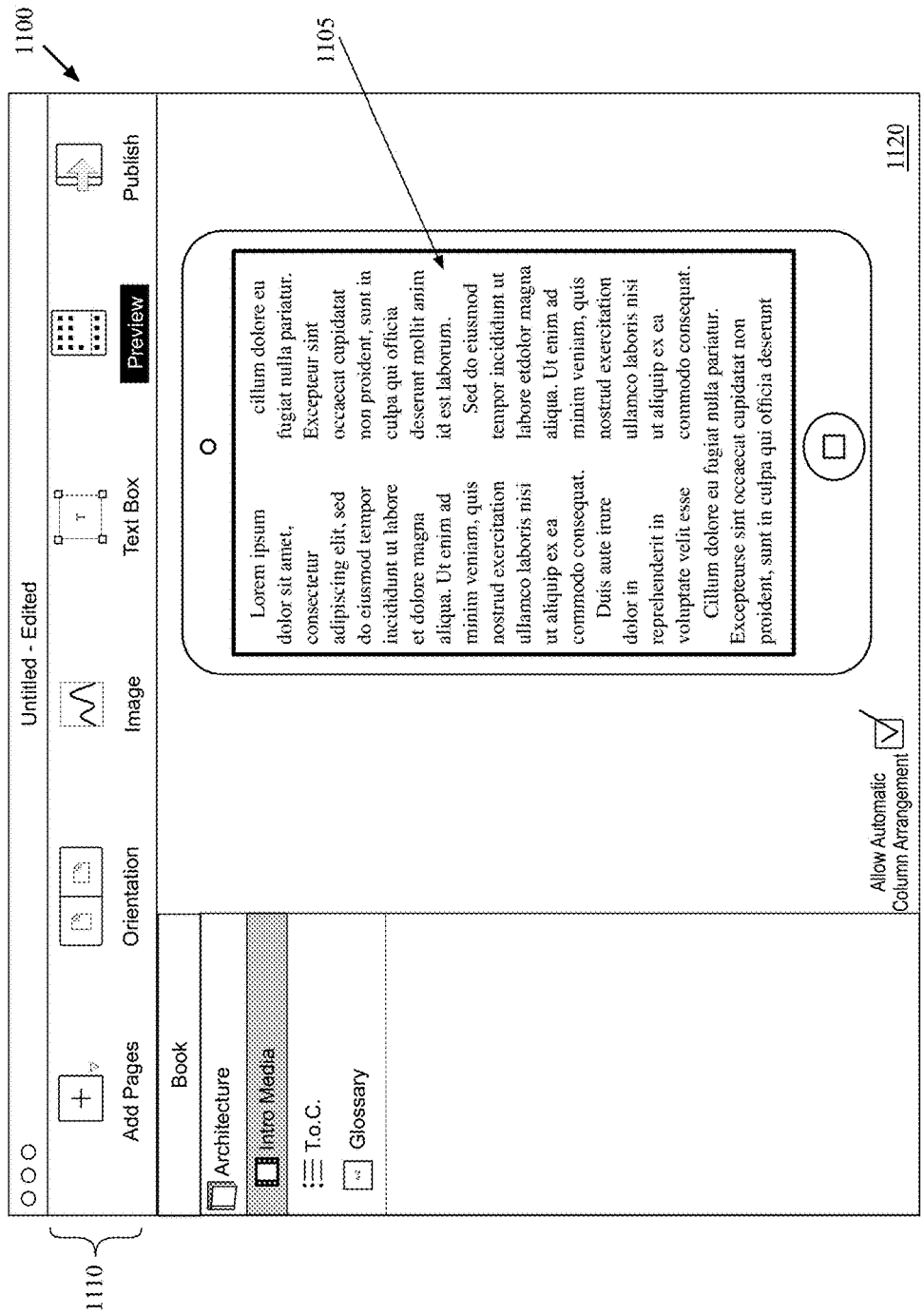
FIG. 12 illustrates the GUI of FIG. 11 with the layout editing and viewing section now displaying the text section within the boundaries of a tablet screen in portrait orientation.

In this example, the user selects the "iPad Portrait" option, which selects a tablet in portrait orientation. FIG. 12 illustrates the GUI 1100 with the layout editing and viewing section 1120 now displaying the text section 1105 within the boundaries of an iPad screen in portrait orientation. The authoring application performs the process 200 (or a similar process) to identify separable segments and divide those segments into multiple columns where possible, using the same constraints that will be present on the selected device. Thus, in this case, the first three paragraphs of the text 1105 are displayed as split between two columns, as would be the case when viewed on the selected device and orientation.

III. Content Viewing Software Architecture

Figure 13:
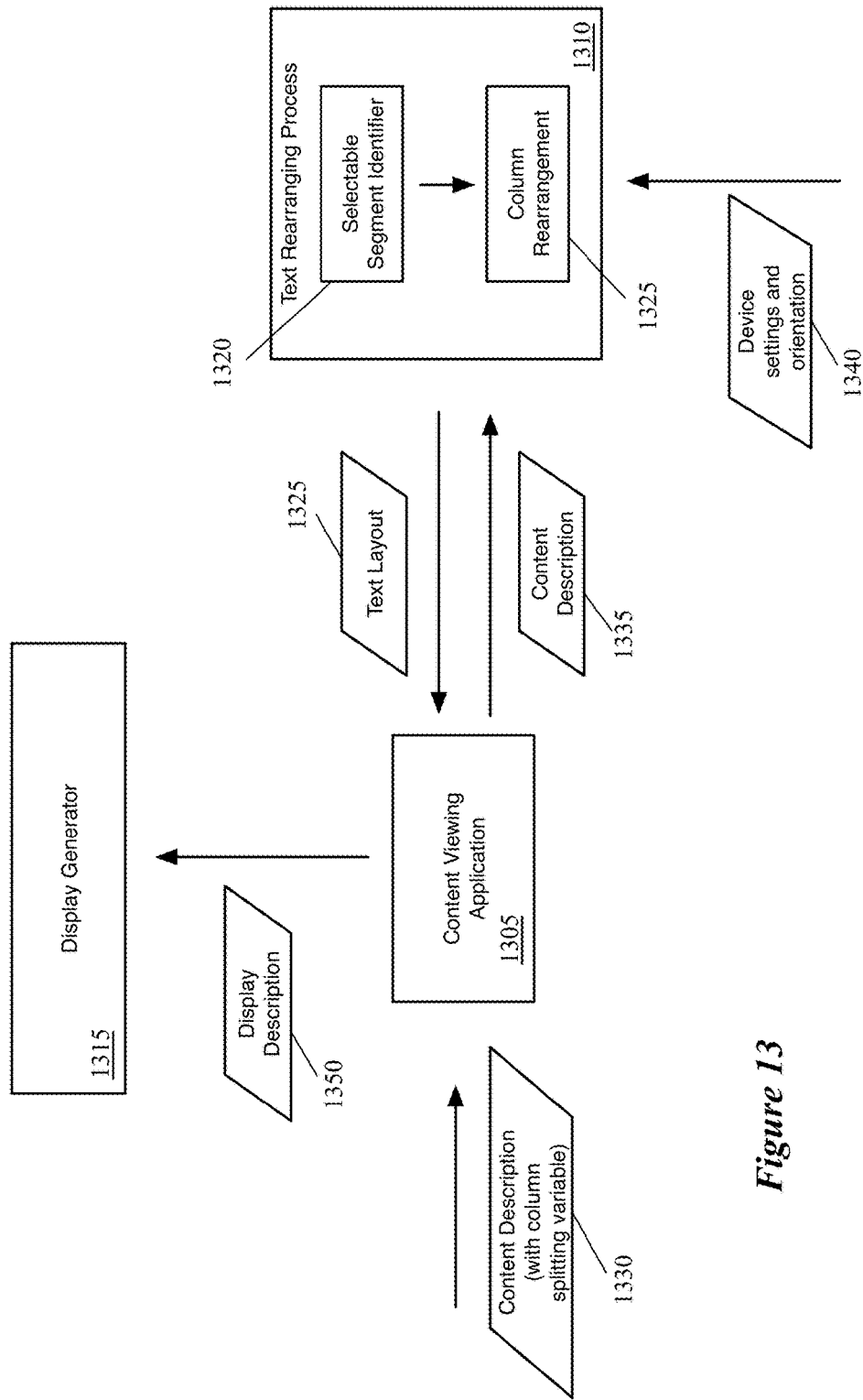
FIG. 13 conceptually illustrates the software architecture of an end user device of some embodiments used to display text content using a variable number of columns

FIG. 13 conceptually illustrates the software architecture of an end user device 1300 of some embodiments used to display text content using a variable number of columns, according to the current settings and orientation of the device, as well as features of the text content. The device 1300 may receive text sources that define text segments as a single column (or simply a contiguous body of text with no particular number of columns specified). As shown, the device 1300 includes a content viewing application 1305, a text rearranging process 1310, and a display generator 1315.

The content viewing application 1305 is utilized by a user of the device to view content on the device. This content may be received from a network (e.g., by downloading the content from a location on the Internet or a local network), stored on a local drive (either a permanent or removable drive) at the device, etc. Examples of such content may include electronic books or magazines, PDF documents, slide presentations, etc. The content viewing application 1305 might be an e-reader such as iBooks, a PDF viewer such as Preview, or the same type of application that was used to create the received content (e.g., a word processor, a slide presentation application, etc.).

The text rearranging process 1310 of some embodiments performs the process 200 of FIG. 2 or a similar process that takes as input a set of text content from a source of text for viewing on the device, and outputs a layout for the text (i.e., the number of columns to use for different segments of the text). As shown, the text rearranging process 1310 includes a separable segment identifier 1320 and a column rearrangement process 1325. The separable segment identifier 1320 of some embodiments analyzes the received text to identify which contiguous segments of text within a text block should be treated as separable segments, and may apply text formatting such as leading to better fit segments within a display. The column rearrangement process 1325 identifies, for each separable segment, the number of columns within which to display the segment, and whether to apply any formatting such as tracking or word spacing modifications in order to satisfy the multi-column requirements imposed by the process 1310.

In this figure, the text rearranging process 1310 is shown as a module separate from the content viewing application 1305 (e.g., as an OS-level process). In some embodiments, the text rearranging process is part of a framework that may be called by numerous different content viewing applications that operate on a device. That is, the process 1310 could be used by the device's electronic book/document viewer, web browser, etc. In other embodiments, the layout rearranging process 1310 is part of the content viewing application 1305.

The display generator 1315 is, in some embodiments, an operating system process that translates the output of the content generation application for a display device (or that of any other application, as well as the OS itself, that causes the display of content on the display device). That is, the display generator 1315 receives signals describing what should be displayed and translates these signals into pixel information that is sent to the display device (which may be part of the device 1300 or a separate device).

An example operation of the end user device 1300 for viewing text content (which may be interspersed with non-text content as well) will now be described. As shown, the content viewing application 1305 receives a content description 1330, which includes a variable identifying whether text splitting is allowed (e.g., a binary variable encoded as metadata). In some embodiments, the content description includes layout information for the content as well as the content itself, such as the text for one or more portions (e.g., as an ordered series of characters). The content description may also include embedded image or video data (or links to videos or images), vector graphics, etc.

A continuous portion of text in the content may be defined, in some cases, as single-column or as an unspecified number of columns (to be determined by the device). So long as the text-splitting variable allows the text to be split across multiple columns, the content viewing application 1305 calls the text rearranging process 1310. In doing so, the content viewing application provides the content description 1335 (e.g., the text for rearrangement) to the text rearranging process 1310. In addition, the text rearranging process 1310 receives device settings and the current device orientation 1340. The device settings may be constants that are part of the code of the layout rearranging process, such as an optimal number of characters per text line. The device settings may also include the current font size (e.g., whether a larger font size is used on the device for a user with poor vision, etc.).

The text rearranging process 1310 then identifies separable segments based on naturally identifiable segmentations in the text as well as whether segments will fit on the display screen used by the device, and rearranges these segments into multiple columns when doing so is optimal. Based on the analysis, the text rearranging process 1310 provides a text layout 1345 to the content viewing application 1305. In some embodiments, the process 1310 actually generates text layout descriptions for both portrait and landscape orientations, so that the content viewing application 1305 can use the current orientation to output the correct layout, and quickly change the layout if the orientation of the device changes. The content viewing application 1305 incorporates the text description and any other content for display into its UI, and generates a display description 1350 which it passes to the display generator 1315, for output to the display device.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
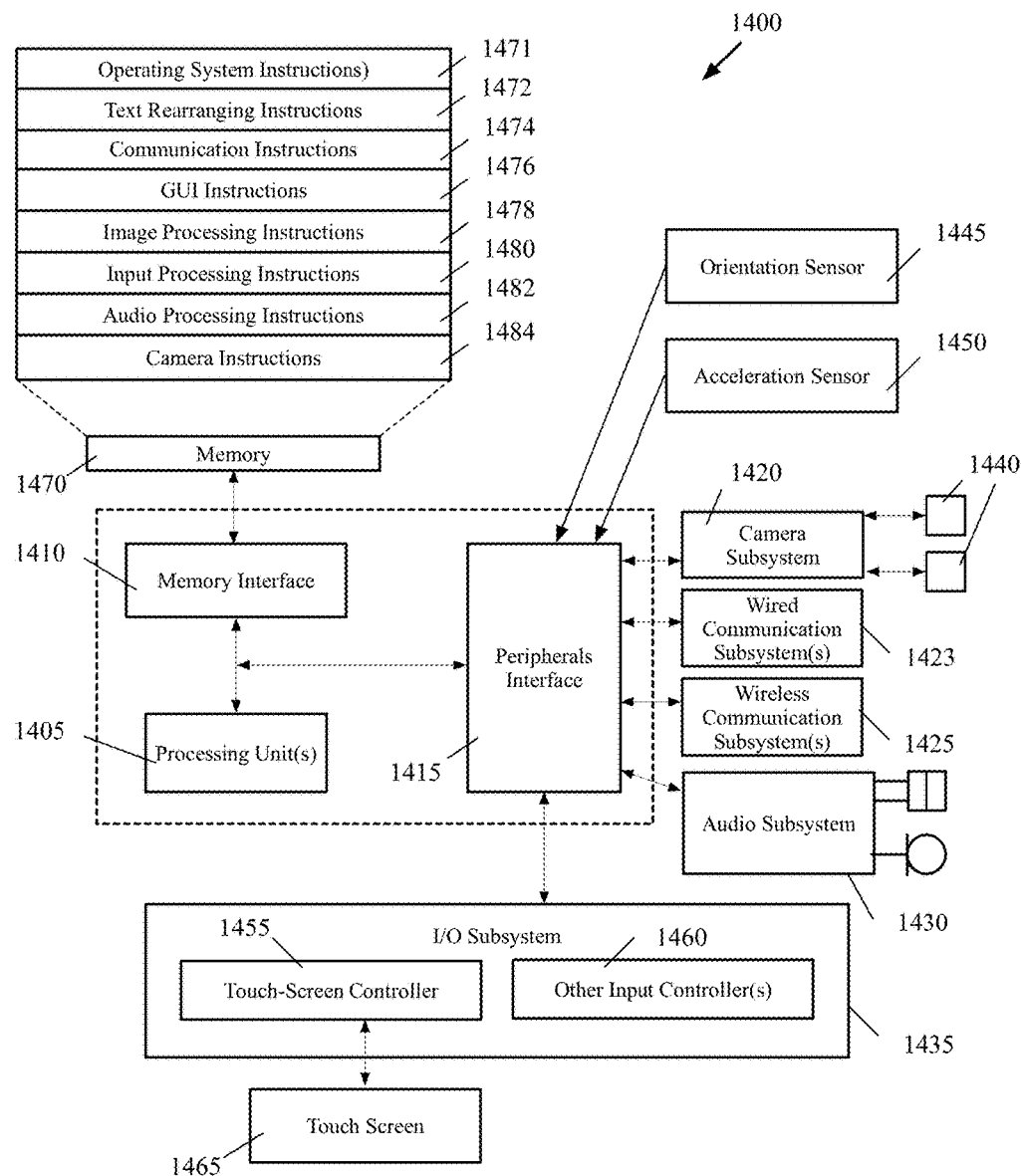
FIG. 14 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 14 is an example of an architecture 1400 of such a mobile computing device. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wired communication subsystem(s) 1423, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wired communication subsystem 1423 and wireless communication subsystem 1425 serve to facilitate communication functions.

In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions in some embodiments.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1471. The OS 1471 includes instructions for handling basic system services and for performing hardware dependent tasks. The memory 1470 additionally includes text rearranging instructions 1472 in order for the device 1400 to perform the text splitting process of some embodiments. In some embodiments, these instructions 1472 may be a subset of the operating system instructions 1471, or may be part of the instructions for an application.

The memory 1470 also includes communication instructions 1474 to facilitate communicating with one or more additional devices (e.g., for peer-to-peer data sharing, or to connect to a server through the Internet for cloud-based data sharing); graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
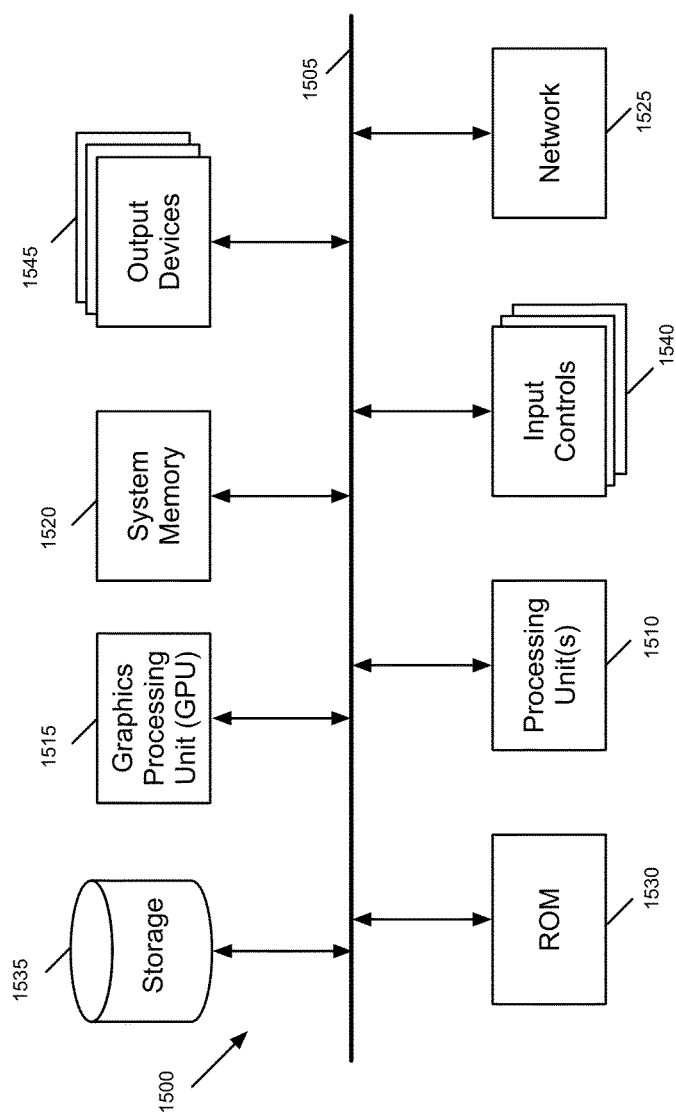
FIG. 15 conceptually illustrates another example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using CoreImage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for displaying text content on a device, the method comprising:
   receiving text content comprising a single document arranged in a single column;
   identifying one or more separable segments of the text content for display on a device, wherein identifying the one or more separable segments of text comprises identifying a contiguous block of text with identifiable divisions prior to and after the contiguous block of text;
   based on properties of at least a portion of the text content and characteristics of the device comprising a size of the device, an orientation of the device, or both, determining whether the one or more separable segments of the text content meets a set of characteristics for dividing the one or more separable segments of text content into more than one column for display;
   for any one or more first separable segments of text content meets the set of characteristics, displaying the one or more first separable segments of text content using more than one column while maintaining the single column for the text content that is not part of the one or more first separable segments; and
   for any one or more second separable segments of text content that do not meet the set of characteristics, displaying the one or more second separable segments of text content using the single column.

2. The method of claim 1, wherein the set of text content is received as part of a document that does not specify a particular number of columns.

3. The method of claim 1, wherein the set of text content comprises a contiguous set of text content from one of an electronic book, an electronic magazine article, a web page, a word processing document, a portable document format (PDF) file, and a slideshow presentation.

4. The method of claim 1, wherein identifying the separable segment comprises:
   determining that the entirety of the contiguous block of text fits within a display screen of the device.

5. The method of claim 1, wherein the identifiable divisions comprise white space that identifies a break between two paragraphs of the text content.

6. The method of claim 5, wherein the white space comprises one of a first-line indent and a skipped line.

7. The method of claim 1, wherein the identifiable divisions comprise text style changes.

8. The method of claim 1, wherein determining whether the separable segment meets the set of characteristics comprises:
   identifying a particular number of columns for displaying the separable segment of the text content on the device based on an orientation of the device and a display font size for the text content; and
   displaying the separable segment across the particular number of columns.

9. The method of claim 8, wherein the particular number of columns is based on an optimal number of characters per text line within a column.

10. The method of claim 8, wherein the set of characteristics comprises a requirement that splitting the text into the particular number of columns not create either of a widow and an orphan.

11. The method of claim 8, wherein the set of characteristics comprises a requirement that each of the columns includes a same number of text lines.

12. The method of claim 8, wherein determining whether the separable segment meets the set of characteristics further comprises applying a modification to the display of the separable segment to enable the separable segment to meet the set of characteristics.

13. The method of claim 12, wherein the modification comprises a modification to at least one of tracking and word spacing for the separable segment.

14. A machine readable medium storing a program which when executed by at least one processing unit displays text content on a device, the program comprising sets of instructions for:
   receiving text content comprising a single document arranged in a single column; identifying one or more separable segments of the text content for display on a device, wherein identifying the one or more separable segments of text comprises identifying a contiguous block of text with identifiable divisions prior to and after the contiguous block of text;
   based on properties of at least a portion of the text content and characteristics of the device comprising a size of the device, an orientation of the device, or both, determining whether the one or more separable segments of the text content meets a set of characteristics for dividing the one or more separable segments of text content into more than one column for display;
   for any one or more first separable segments of text content meets the set of characteristics, displaying the one or more first separable segments of text content using more than one column while maintaining the single column for the text content that is not part of the one or more first separable segments; and
   for any one or more second separable segments that do not meet the set of characteristics, displaying the one or more second separable segments of text content using the single column.

15. The machine readable medium of claim 14, wherein the set of instructions for identifying the one or more separable segments comprises sets of instructions for:

determining that the entirety of the contiguous block of text fits within a display screen of the device.

16. The machine readable medium of claim 14, wherein the identifiable divisions comprise white space that identifies a break between two paragraphs of the text content.

17. The machine readable medium of claim 14, wherein the identifiable divisions comprise text style changes.

18. The machine readable medium of claim 14, wherein the set of instructions for determining whether the one or more separable segments meets the set of characteristics comprises sets of instructions for:
identifying a particular number of columns for displaying the one or more separable segments of the text content on the device based on an orientation of the device and a display font size for the text content; and
determining whether the one or more separable segments satisfies a set of characteristics for display across the particular number of columns.

19. An electronic device comprising:
a set of processing units for executing sets of instructions; and
a machine readable medium storing a program which when executed by at least one processing unit in the set of processing units displays text content on a device, the program comprising sets of instructions for:
receiving text content comprising a single document arranged in a single column;
identifying one or more separable segments of the text content for display on a device, wherein identifying the one or more separable segments comprises identifying a contiguous block of text with identifiable divisions prior to and after the contiguous block of text;
based on properties of at least a portion of the text content and characteristics of the device comprising a size of the device, an orientation of the device, or both, determining whether the one or more separable segments of the text content meets a set of characteristics for dividing the one or more separable segments of text content into more than one column for display;
for any one or more first separable segments of text content meets the set of characteristics, displaying the one or more first separable segments of text content using more than one column while maintaining the single column for the text content that is not part of the one or more first separable segments; and
for any one or more second separable segments of text content that do not meet the set of characteristics, displaying the one or more second separable segments of text content using the single column.

20. The electronic device of claim 19, wherein the set of instructions for determining whether the one or more separable segments meets the set of characteristics comprises sets of instructions for:
identifying a particular number of columns for displaying the one or more separable segments of the text content on the device based on an orientation of the device and a display font size for the text content; and
determining whether the one or more separable segments satisfies a set of characteristics for display across the particular number of columns.

21. The electronic device of claim 20, wherein the particular number of columns is based on an optimal number of characters per text line within a column.

22. The electronic device of claim 20, wherein the set of characteristics comprises (i) a first requirement that splitting the text into the particular number of columns not create either of a widow and an orphan and (ii) a second requirement that each of the columns includes a same number of text lines.

23. The electronic device of claim 20, wherein determining whether the one or more separable segments meets the set of characteristics further comprises applying at least one of tracking and word spacing to the display of the one or more separable segments to enable the one or more separable segments to meet the set of characteristics.

24. The electronic device of claim 19, wherein the program further comprises a set of instructions for determining whether text splitting is allowed for the set of text content, wherein the sets of instructions for identifying the one or more separable segments, determining whether the one or more separable segments meets the set of characteristics, and displaying the one or more separable segments of text content using more than one column are only performed when text splitting is allowed for the set of text content.

25. The electronic device of claim 24, wherein whether text splitting is allowed is determined based on a variable set for the received set of text content by an author of the set of text content.

* * * * *